(12) United States Patent
Golcz

(10) Patent No.: US 9,499,424 B2
(45) Date of Patent: Nov. 22, 2016

(54) INSTALLATION AND METHOD FOR WASTEWATER TREATMENT

(71) Applicant: Andrzej Golcz, Warsaw (PL)

(72) Inventor: Andrzej Golcz, Warsaw (PL)

( * ) Notice: Subject to any disclaimer, the term of this patent is extended or adjusted under 35 U.S.C. 154(b) by 0 days.

(21) Appl. No.: 14/443,049

(22) PCT Filed: Nov. 12, 2013

(86) PCT No.: PCT/PL2013/000144
§ 371 (c)(1),
(2) Date: May 14, 2015

(87) PCT Pub. No.: WO2014/077711
PCT Pub. Date: May 22, 2014

(65) Prior Publication Data
US 2015/0284279 A1    Oct. 8, 2015

(30) Foreign Application Priority Data

Nov. 16, 2012   (PL) .......................... 401650

(51) Int. Cl.
| | | |
|---|---|---|
| *C02F 9/00* | (2006.01) | |
| *C02F 1/20* | (2006.01) | |
| *C02F 3/30* | (2006.01) | |
| C02F 3/12 | (2006.01) | |
| B01D 21/02 | (2006.01) | |
| C02F 101/16 | (2006.01) | |

(52) U.S. Cl.
CPC . *C02F 9/00* (2013.01); *C02F 1/20* (2013.01); *C02F 3/302* (2013.01); *C02F 3/308* (2013.01); B01D 21/02 (2013.01); C02F 3/121 (2013.01); C02F 2101/163 (2013.01); C02F 2301/046 (2013.01); C02F 2305/06 (2013.01); Y02W 10/15 (2015.05)

(58) Field of Classification Search
None
See application file for complete search history.

(56) References Cited

U.S. PATENT DOCUMENTS

| | | |
|---|---|---|
| 5,342,522 A | 8/1994 | Marsman et al. |
| 5,651,892 A | 7/1997 | Pollock |
| 6,224,772 B1 | 5/2001 | Golcz |
| 9,039,897 B2 * | 5/2015 | Stroot ..................... C02F 3/006 210/259 |
| 2004/0238441 A1 | 12/2004 | Tanaka et al. |

FOREIGN PATENT DOCUMENTS

| | | |
|---|---|---|
| EP | 2196438 A1 | 6/2010 |
| WO | 2012/112679 A2 | 8/2012 |
| WO | 2013/016438 A2 | 1/2013 |

OTHER PUBLICATIONS

International Search Report for App. No. PCT/PL2013/000144 mailed Feb. 19, 2014.

* cited by examiner

*Primary Examiner* — Chester Barry
(74) *Attorney, Agent, or Firm* — Walker & Jocke

(57) ABSTRACT

A method for wastewater treatment, in a continuous flow system, and a plant for wastewater treatment, to achieve high level reduction of biogenic nitrate compounds are provided. Subjecting a mixture of active sludge and wastewater to vacuum degassing on the mixture that has been subject to earlier nitrification, but not introduced in a recirculation-return connection, and constituting the outflow from a nitrification volume, before degassing, is subject to additional denitrification. The mixture of active sludge and wastewater, due to the additional denitrification step, may be free of carbon carried along with wastewater. An external source of readily available carbon is introduced, and further deepened nitrates removal is performed. After wastewater is degassed, treatment continues within a gaseous nitrogen undersaturated aqueous zone of a secondary sedimentation tank.

8 Claims, 4 Drawing Sheets

INSTALLATION AND METHOD FOR WASTEWATER TREATMENT

TECHNICAL FIELD

Exemplary embodiments provide a method for wastewater treatment in a flow system, and a plant for wastewater treatment, which require a high level of reduction of biogenic nitrate compounds.

BACKGROUND

In known wastewater treatment methods, relying on the use of active sludge, suspension of the active sludge in a mixture with wastewater being treated is maintained by mixing of the contents of process chambers. Then the mixture is fed to a secondary sedimentation tank, where the sludge is deposited, and the decanted liquid, being purified wastewater, is fed to a collecting tank. The precipitated deposit is again used in the treatment process. In such processes, the concentration of the active sludge in treatment chambers is maintained at a level of 3.5 kg/m$^3$, and this results in a considerable treatment volume for the respective plant.

From the Polish patent application, 172080 a flow wastewater treatment method is described, where the purification process is carried out consecutively within a wastewater dephosphatation chamber, wastewater denitrification chamber, and then a wastewater nitrification chamber, with the use of a return internal repetitive recirculation of nitrified wastewater from the aerated nitrification chamber for denitrification step. As a result of which, active sludge is subjected several times to alternating denitrification and nitrification processes.

Active sludge is in contact with all kinds of carbon present in the wastewater. The active sludge is more prone to use the available carbon forms. Therefore, in the effluent, there remain forms of carbon that are not suitable for life. Flow velocity through the individual chambers is high, and, and in the initial purification chambers the forms of carbon are readily available and abundant and are unrestrictedly accessible for the sludge. Sewage effluent from aeration chambers is carried to a suction chamber of a vacuum degassing tower. The effluent is then subject to vacuum degassing and routed to a secondary sedimentation tank. Deposits precipitated in the sedimentation tank are reused in the purification process and routed to the beginning of the purification process. This is done as the purification process maintains its capability to purify newly fed amounts of wastewater to the beginning of the process. Decanted liquid, being purified wastewater, is routed to a collection tank.

In this process, purification may occur at the actual sludge concentration of 6.5 to 7.5 kg of dry mass/m$^3$. With a considerable decrease in cubic capacity of purification chambers and an increase of process intensity with regard to the so-far existing practical opportunities, this allows achieving a new higher level of purification as well as provides new opportunities for its technical development.

Typically, a phenomenon of intense denitrification occurs in active sludge chambers, and in the secondary sedimentation tank. Although nitrates are present, the denitrification process runs slower and its intensity is limited by absence of readily available carbon. Readily available carbon is an indispensable substrate of biochemical denitrification reaction. This reaction consists of decomposition of nitrates into oxygen and nitric acid. This reaction is subject to dissolution in gaseous nitrogen-undersaturated water, mixing, caused by vacuum degassing, the active sludge in wastewater being purified. But, this reaction does not result in denitrification-induced floatation and swelling of the sludge, and does not hinder thickening of the sludge on the bottom of the sedimentation tank. It is a reason for slow course of the denitrification reaction. The denitrification reaction is necessary and desired for the operation of the sedimentation tank when the nitrogen being produced is dissolved in an undersaturated aqueous solution.

Populations grow, urbanization and industrialization of the world induce increases in the amount of wastewater carrying biogenic contamination, particularly nitrogen, and causing harmful effects for the natural environment, such as intensive destruction by entrophisation, consisting of water algae blooming in surface water where the discharge for purified wastewater occurs. Prevention of this phenomenon requires use of complex methods of wastewater treatment, that may be highly expensive and operationally unreliable, and many involve considerable difficulties in operational handling for strict requirements for discharge of such entrophisation impurities.

With regard to the above, the solution according to the Polish patent application P380965, is an additional step is added to the secondary sedimentation tank, consisting of performing within the volume thereof, an additional intense and fast running process for wastewater treatment, resulting in removal of nitrogen compounds by means of denitrification.

According to application P380965, wastewater is mixed with active sludge and is purified in biological chambers. The sludge is then fed to a suction chamber of a vacuum degassing tower, where the mixture is subjected to vacuum degassing, followed by feeding to the secondary sedimentation tank and re-use of deposits collected in the secondary sedimentation tank for secondary purification of wastewater by removing nitrogen compounds. Then, in the volume of the secondary sedimentation tank, optionally at its inflow, at least one carbon compound is introduced, in at least one carbon compound such that comprises carbon readily available for active sludge. Intensive secondary denitrification is induced that causes decomposition of nitrates and removal of nitrogen from wastewater and continues until depletion of the readily available carbon. Simultaneously, the level of discharge of nitrogen from wastewater is increased to a value that allows for absorption of $N_2$-undersaturated liquid, activated in the induced intense denitrification process of gaseous nitrogen, obtained from the use of readily available carbon. The nitrogen discharge comprises gaseous nitrogen released as a result of denitrification from the residual process with depletion of the source of readily available carbon. Moreover the level of undersaturation of the liquid with gaseous nitrogen is maintained so as to carry on sedimentation process under conditions that enable denitrification-induced hindrance of sedimentation capacity of the sludge.

SUMMARY

Feeding from a source of readily available carbon to the active sludge, actually feeding to the vacuum degassed liquid at the inflow to the secondary sedimentation tank, creates an unexpected opportunity for the use of the volume of the secondary sedimentation tank and inflows, for carrying out processes of intense biological nitrogen removal. In particular the use of the volume thereof and the use of the capacity of the low gaseous nitrogen-content aqueous solution, provides for intense denitrification. The scope of the denitrification is purposefully limited by the amount of fed readily available carbon that is dosed in a way that the intense denitrification process uses substantially a part of the capacity of undersaturation of the aqueous solution so as to leave an undersaturation margin for effectively performing, within the secondary sedimentation tank, the basic sedimentation process, still under conditions of nitrogen-undersaturated aqueous solution.

DETAILED DESCRIPTION

In one exemplary embodiment, a method for wastewater treatment, in a continuous flow system, in particular for a requirement of high level reduction of biogenic nitric compounds, consists on subjecting wastewater to consecutive steps of removing different forms of impurities included therein, performed in consecutive separated volumes, where active sludge is subjected to varied work and operation conditions, as well as internal recirculation-return connections, as a result of which readily available and averagely available carbon becomes depleted. Within the first volume, the dephosphatation process is carried out, within the second one the denitrification process, and within the third volume the nitrification process, from which recirculation-return connection is provided to the inflow of denitrification volume, ensuring thereby maintaining of the flow efficiency within the entire system of the mentioned volume that several times exceeds the flow effectiveness of wastewater fed for treatment. Then a mixture of active sludge and wastewater is subject to vacuum degassing in a tower for vacuum degassing, from where the purified wastewater is discharged, and the active sludge deposited on the bottom, being external recirculate, is routed again to the beginning of the process, through the wastewater feed.

In an exemplary embodiment, a mixture of the active sludge and wastewater, after earlier nitrification but not introduced in a recirculation-return connection to the inflow to a denitrification volume, is subject to additional denitrification during which the remaining readily available carbon and minimally available carbon forms, carried along with wastewater, become consumed, optionally even with consumption of intracellular carbon of active sludge, with continued proceeding with denitrification process in the secondary sedimentation tank.

In a further exemplary embodiment, to the mixture of active sludge and wastewater, freed, in the course of additional denitrification, from a substantial majority of all kind of averagely available and minimally available carbon carried along with wastewater, any kind of external source of readily available carbon is introduced, and further deepened removal of nitrates is carried out through reaction of this carbon with the sludge, and thus initiated process for removal of nitrates after wastewater has been passed through the vacuum degassing step is continued within a gaseous nitrogen-undersaturated aqueous zone of the second sedimentation tank.

In a variant of an exemplary embodiment of the wastewater treatment method, a continuous flow system, in particular for a requirement of high level of biogenic nitrate compounds reduction, consisting of subjecting wastewater to consecutive steps of removing different forms of impurities included therein, performed in the consecutive separated volumes, where active sludge is subjected to different work and operation conditions and internal recirculation-return connections, as a result of which depletion occurs of readily available and averagely available carbon, where within the first volume the dephosphatation process is performed, within the second one the denitrification process, and within the third volume the nitrification process, from which a recirculation-return connection is provided to the inflow into the denitrification volume, while maintaining thereby flow effectiveness within the entire sequence of the mentioned volumes which is several times higher than flow effectiveness of wastewater fed for treatment, and then subjecting the mixture of active sludge and wastewater to vacuum degassing in a tower for vacuum degassing from which effluent of purified wastewater occurs, and finally routing active sludge being deposited in the sedimentation tank on the bottom, being an external recirculate, back to the beginning of the process, through the wastewater inflow, it is contemplated that to the mixture of active sludge and wastewater, after earlier nitrification but not introduced in the recirculation-return connection to the inflow into the denitrification volume, any kind of external readily available carbon is introduced and deepened nitrate removal is performed by reacting this carbon with the sludge, and also the use of the averagely available and minimally available carbon carried along with wastewater is inhibited up to the complete consumption of this carbon before vacuum degassing, and thus initiated deepened nitrate removal process continues within the gaseous nitrogen-undersaturation zone of the secondary sedimentation tank where the residues of averagely available and minimally available carbon are consumed as included in wastewater after nitrification, along with possible consumption of the intracellular carbon of active sludge.

According to one exemplary embodiment, a plant for wastewater treatment, in a continuous flow process, in particular for a requirement of high level reduction of biogenic nitrate compounds, by means of subjecting wastewater consecutively to successive steps of removal of various forms of impurities included therein, comprising in succession a dephosphatation volume, denitrification volume and nitrification volume from which a recirculation-return connection is provided to the inflow to the denitrification volume, and then a vacuum degassing volume, followed by a secondary sedimentation tank with the outflow of purified wastewater, connected to the wastewater inflow to the dephosphatation volume by recirculation of sediments being deposited, is characterized by that it has an additional denitrification volume, defined downstream the nitrification volume and upstream a vacuum degassing volume for the mixture of active sludge and wastewater being purified.

An exemplary embodiment includes between the additional denitrification volume and the vacuum degassing tower for a mixture of active sludge and wastewater being purified, has a deepened nitrate removal volume, connected to an external source of readily available carbon.

In an exemplary embodiment, it is also contemplated that a plant for wastewater treatment, in a continuous flow process, in particular for a requirement of high level reduction of biogenic nitrate compounds, by means of subjecting wastewater consecutively to successive steps of removal of various forms of impurities included therein, comprising successively a dephosphatation volume, denitrification volume and nitrification volume from which a recirculation-return connection is provided to an inflow into the denitrification volume, and then a vacuum degassing volume followed by a secondary sedimentation tank with an outflow of purified wastewater, connected to the inflow to the dephosphatation process, has a deepened nitrate removal volume, connected to a source of readily available carbon, positioned downstream the nitrification volume and upstream the vacuum degassing tower for a mixture of active sludge and wastewater being purified.

In the solution of an exemplary embodiment, independently of the impact of denitrification internal recirculation, performed in the upstream purification process volume, and independently of the impact thereof, a deepened process of nitrogen removal is carried out by means of further reduction of nitrates so as to enhance considerably nitrogen removal and at the same time increase carbon removal and obtain, by lowering the nitrate amount in the inflow to the secondary sedimentation tank, optional sedimentation capabilities of the sludge that make it possible to increase the sludge concentration throughout the entire purification process to a practical level of 7.5-10 kg of dry mass in one cubic meter.

The use according to an exemplary embodiment of a new separated volume positioned downstream the nitrification chamber and upstream the vacuum degassing volume for a mixture of active sludge in wastewater being purified, considerably raises effectiveness of deepened nitrates removal and considerably broadens the opportunity to carry out the entire wastewater treatment process at a higher sludge concentration in the process.

This effect is possible to be obtained as a result of introducing at this point a sequence of purification in this additional volume and substantially resignation from internal recirculation of any kind from and to this volume, such that to the denitrification process performed therein access to readily available and averagely available carbon carried along with wastewater is cut off, and at the same time, a meaningful decrease in wastewater passage through this volume relative to other upstream volumes for wastewater purification is obtained, as well as the inflow of carbon is limited exclusively to the residual forms after the basic purification process that precedes it. This can be defined in a manner that the nitrogen removal process has been condensed with limitation of passage through this volume and elimination of a possibility to provide readily available and averagely available carbon, thus making the sludge to consume exclusively the minimally available carbon and upon depletion thereof to initiate even consumption of its own carbon of the internal active sludge.

In an exemplary embodiment, wastewater treatment with active sludge is performed in such a manner that the stream constituting the outflow of wastewater from wastewater nitrification volume, being outside the repeated internal recirculation area, is collected in a separated volume, where under conditions of absence of access to an external carbon source, and under conditions of a very high concentration of deposit, with considerably higher flow purification technologies, with absence of access to gaseous oxygen or in oxygen-free conditions, under intense stirring of the contents of the collection volume an with abundant access to abundant oxygen resources included in the nitrates, it is induced that the highly concentrated active sludge consumes exclusively the averagely available and then minimally available carbon, and finally to initiate the use of intracellular carbon of the active sludge itself. As a result, a limited but operationally meaningful decrease in the nitrate content in the outflow is obtained, with reduction being about 20-40%, as well as additional carbon reduction decrease as expressed in Biochemical Oxygen Demand (BOD) of about 20-30% which causes, due to depletion in the preceding enhanced denitrification process of any carbon forms carried along with wastewater, slowing of the denitrification process occurring within the nitrogen-undersaturated aqueous volume of the secondary sedimentation tank, caused by a relatively long dwelling time in the sedimentation tank, useful and considerable reductions of nitrogen/nitrates in this wastewater stream. The vacuum degassing-induced undersaturation of the aqueous solution with gaseous nitrogen assures easy dissolution of microbubbles of gas produced in the sludge floccules, and this way enhances sedimentation capabilities of sludge are obtained, and finally an opportunity emerges to use higher concentrations of sludge within the entire wastewater purification process, resulting from further increase of its sedimentation capabilities so as to ensure better and more effective removal of nitrogen and other impurities in the entire course of purification, from dephosphatation to the outflow.

Thus unexpectedly, lagooning of a mixture of purified wastewater after nitrification process and out of the denitrification recirculation area, under oxygen-free conditions, at a very high deposit concentration, without alternation of feeding of readily available and averagely available carbon carried along with wastewater, the active sludge is forced, so as to maintain its deposit life functions, to consume solely minimally available carbon, and with regard to its further unavailability for the sludge, to consume intracellular carbon of the sludge itself, with concurrent intense stirring under such conditions. As a consequence, maintaining life processes of the sludge leads to the use of oxygen comprised by the residual nitrates included in the mixture, or effecting denitrification process.

These nitrates, prepared in the preceding nitrification process, are mainly returned along with denitrification recirculation to the denitrification process, but a part of them included in the outflow stream, correspondingly to the amount of this internal recirculation and the one remaining outside it, are routed with the outflow as a non-removed nitrate/nitrogen for further outflow in the wastewater flow purification process being carried out.

Since the amount of recirculation is for technical reasons restricted and maintained at a level of about 4 times relative to the flow, then the nitrification volume that produces nitrates is several times diluted due to this repeated recirculation and the overall mixed outflow from this volume of a uniform nitrogen/nitrate content is divided at the outflow into denitrification recirculation that carries produced diluted nitrates purposefully to further denitrification in the denitrification chamber, with access to readily available carbon, while the other stream constituting the outflow, according to the schematic view of the state presented in FIG. 1 in an amount of 2 Q or 33% of the flow through the chamber, disposed of a possibility of purposeful denitrification operation, carries an amount of not-denitrified nitrogen compounds in a form of nitrates to a further outflow and this way 33% included in the diluted nitrification volume nitrates enter the outflow.

Returning 67% of the outflow amount returns to the denitrification process, where the sludge consumes readily available and averagely available carbon and decomposes a predominant part of nitrates with the use of a part of carbon carried along with wastewater to this denitrification process, and the amount of nitrates, decreased as a result of reduction within the denitrification volume, flows into the nitrification volume and dilutes the concentration of nitrates therein. In a further part of the process consisting on nitrification, further removal of readily available and averagely available carbon occurs and nitrification of the raw wastewater stream fed is carried out to form new nitrates and maintain the nitrates level at the outflow from the nitrification volume at a predetermined level resulting from the course of nitrification and denitrification as well as recirculation that averages the nitrate content within this volume.

Leaving the active sludge mixture after these processes, constituting outflow under conditions of absence of alternate effect of recirculation under conditions of high deposit concentration possible to be used in the technology causes unexpectedly meaningful further decrease in the nitrate/nitrogen content, and effectively lowers these nitrogen amounts that are difficult to be removed.

This refers to the issue of the nitrogen content following the main purification process and nitrogen such reduced therein, and unexpectedly important results for the strict requirements for the final effect of nitrogen removal are obtained, with the decrease of its contents in further outflow.

Nevertheless, such further removal of nitrogen causes an additional effect and enhances sedimentation conditions within the secondary sedimentation tank, since decrease in the amount of nitrates fed and decrease in the intensity of denitrification process in the sedimentation tank enhance sedimentation capability of the sludge and causes an unexpected opportunity to raise the sludge concentration throughout the entire process for wastewater treatment to concentrations presently used.

Therefore, in carrying out a process with vacuum degassing of sludge, in which wastewater purification process is performed at a very high sludge concentration, it is disclosed that the outflow of a mixture of sludge in purified wastewater following the nitrification process, after the complete purification process and routed to the outflow through the sedimentation tank, the flow is stopped within a separated volume where unexpectedly and surprisingly shows—a course of effective and having a utility relevance in its extent of an additional denitrification of wastewater outflow, without need to dispense from an external carbon source.

Within this volume, the mixture of active sludge in purified wastewater is subject to additional treatment by means of retaining the outflow following the nitrification process, consisting on separation of this additional volume for retaining wastewater, where under oxygen-free conditions, with absence of access to gaseous nitrogen, and at the same time with very abundant resources of oxygen from the $NO_3^-$ form, when carrying out the process with the use of vacuum degassing of the sludge, under conditions of a very high sludge concentration and intense stirring in the volume, sludge of a high denitrification capabilities is forced to undergo intense life process with the use of carbon that is present solely in a form of residues of averagely available, and substantially minimally available carbon, and finally even intracellular one of active sludge, and this leads to considerable additional denitrification of the outflow discharged from the nitrification volume.

As a result of this action, further lowering of the nitrate content in wastewater occurs, from which, in a further flow under vacuum degassing conditions, the separated in the additional denitrification process gas microbubbles are sucked off from floccules of sludge, and in particular gaseous nitrogen-undersaturation of water is produced, and then the outflow that contains decreased nitrate content is routed to the secondary sedimentation tank, where the final denitrification phase occurs.

The denitrification process further proceeds in the secondary sedimentation tank in the gaseous nitrogen-undersaturation area caused by vacuum degassing. The further course of denitrification running in the sedimentation tank is based on smaller amounts of nitrates and proceeds with separation of gaseous nitrogen that dissolves in the gaseous nitrogen undersaturated aqueous volume caused by vacuum degassing and fills so as not to cause complete saturation thereof.

As a result of additional denitrification, decrease of inflow of nitrates into the secondary sedimentation tank causes a decrease in intensity of the nitrification processes occurring therein, inter alia as a result of more prominent deficiency of carbon consumed earlier in additional denitrification. This causes lesser filling of the deficiency in saturation of the liquid in the sedimentation tank with gaseous nitrogen.

Preventing complete filling of undersaturation of the liquid with gaseous nitrogen and maintaining a considerable gaseous deficiency in the liquid of the secondary sedimentation tank has an important impact onto the sedimentation properties of the sludge. With a large deficiency in undersaturation of the liquid with nitrogen that is separated in the floccules of the sludge in the denitrification process, nitrogen shows a capacity to be dissolved in an undersaturated solution and be removed readily from sludge floccules.

This ease diminishes along with decrease of the value of deficiency and fades entirely with its elimination. Complete filling is meant as accumulation of separated nitrogen in sludge floccules, since there is nothing it might be dissolved in, and sludge shows poorer sedimentation capability, while with a prominent nitrogen deficiency, transfer of gaseous nitrogen from sludge floccules is enabled, and sludge acquires sedimentation capability.

This way, with the use of additional denitrification, the inflow of nitrates into the secondary sedimentation tank is decreased and a possibility is created to maintain more prominent deficiency which in turn surprisingly enables maintaining the sludge concentration in the process at a considerably higher level.

As a consequence, surprisingly and unexpectedly the final effect of the use of additional denitrification is an opportunity to enlarge the amount of biomass throughout the purification process. Another surprising effect of such enlargement of biomass in the processes is enhancement of the entire purification process in the denitrification, nitrification and additional denitrification volumes that results in better purification of wastewater with regard to nitrogen and carbon within these areas, and facilitates carrying out of the entire process.

The contemplated use of an exemplary embodiment of additional denitrification of a wastewater outflow stream, routed to the secondary sedimentation tank, when maintaining the extent of denitrification in the secondary sedimentation tank, causes obtaining more prominent undersaturation of the liquid with nitrogen and this enhances sedimentation capability of sludge and enables use of higher sludge concentrations throughout the entire wastewater purification process.

Dephosphatation may occur as a result of chemical precipitation or sludge content choice, among other methods.

Sources of carbon may include but are not limited to, methanol, ethanol, acetate, acetic acid, glycerol, fat, sugar, other microorganisms, and proprietary formulations.

Active sludge provides, but is not limited to, a plurality of different bacteria and protozoa and other microbial life.

Aeration of wastewater may be carried out by passing air through wastewater by using a system of perforated nozzles at the bottom of the tank. One may also employ turbulence wastewater aerators using mixing the entire contents of the tank.

In a vacuum degasser tower, water flows by gravity down through a tower filled with packing as a vacuum is drawn on the tower. The packing in the tower has a very high surface area, disperses the water very effectively, thereby enhancing the removal of $O_2$, $CO_2$ and $N_2$. Performance is further enhanced by using atomizing nozzles as the water enters the tower.

Carbon comes in different forms, which are readily, averagely and minimally digestible, or available, for active sludge organisms. These are the readily, averagely and minimally consumed by sludge. Active sludge consumes readily available forms and then averagely available forms of carbon. Minimally available carbon consists of internal carbon from cells of active sludge organisms and it is consumed under extreme lack of carbon conditions and is connected with necrobiosis of weaker microorganisms of this active sludge.

It is difficult to provide removal of nitrogen compounds from waste water. This is because the preparation of considerable undersaturation of aqueous solution is difficult, when it is assumed that at the wastewater temperature of 22° C. nitrogen saturation is 16 g/m³, it is operationally possible to obtain undersaturation of 40%, and then the value of undersaturation will be:

16×0.4=6.4 g/m³.

Therefore, in practice, the extent of the use of the secondary tank volume, when leaving an undersaturation at a level of 2-3 g/m³ in the course of a very fast reaction, with addition of an external carbon source to a level of incomplete consumption of undersaturation of water with gaseous nitrogen is, calculated for summer conditions:

6.4 g/m³-3 g/m³=3.4 g/m³.

Numerous wastewater treatment plants operate under summer conditions at a temperature of 22° C., and in warmer climates even 27° C., in hot areas even 30° C.

For a moderate zone at t=23° C. nitrogen solubility is 15 g/m³, and then undersaturation will be:

15 g/m³×0.40=6 g/m³, and available undersaturation will be:

6 g/m³-3 g/m³=3 g/m³.

The remaining undersaturation at a level of 2 g/m³ with an impetuous course of the process with addition of readily available carbon must cover irregularities in inflow amounts, and in particular quality and kind of impurities and operational inaccuracies, which with regard to impetuous process course is difficult and involves some risk. As a result, it would be necessary to substantially increase the margin, and this limits the possibility to make use of the volume for nitrogen reduction within the range of solely 3 g/m³.

DETAILED DESCRIPTION OF THE DRAWINGS

EXAMPLES

Exemplary embodiments of a method for wastewater treatment in a flow system and a plant for wastewater treatment utilizing the principals described herein are further illustrated by the following examples, which are set forth to illustrate the presently disclosed subject matter and are not to be construed as limiting.

Example 1

Figure 1:
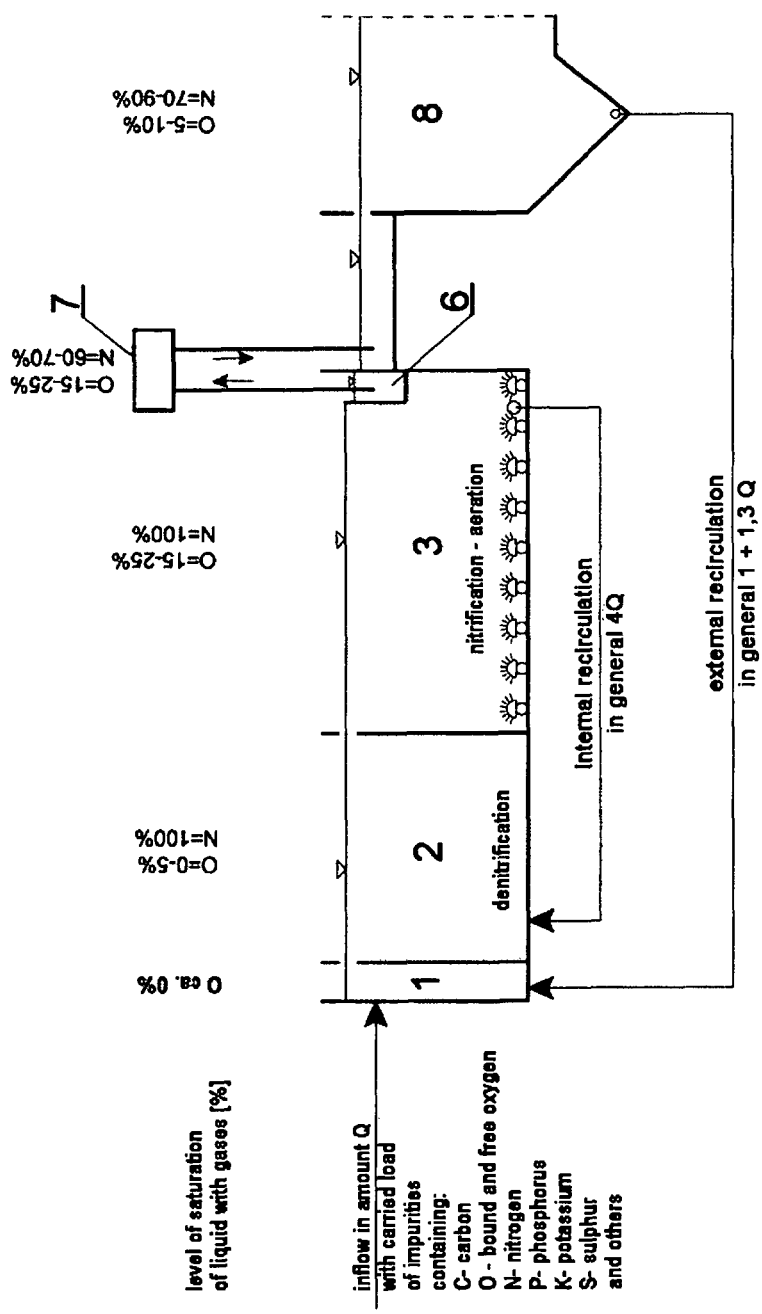
FIG. 1 illustrates a wastewater treatment plant, in a schematic diagram.
Figure 2:
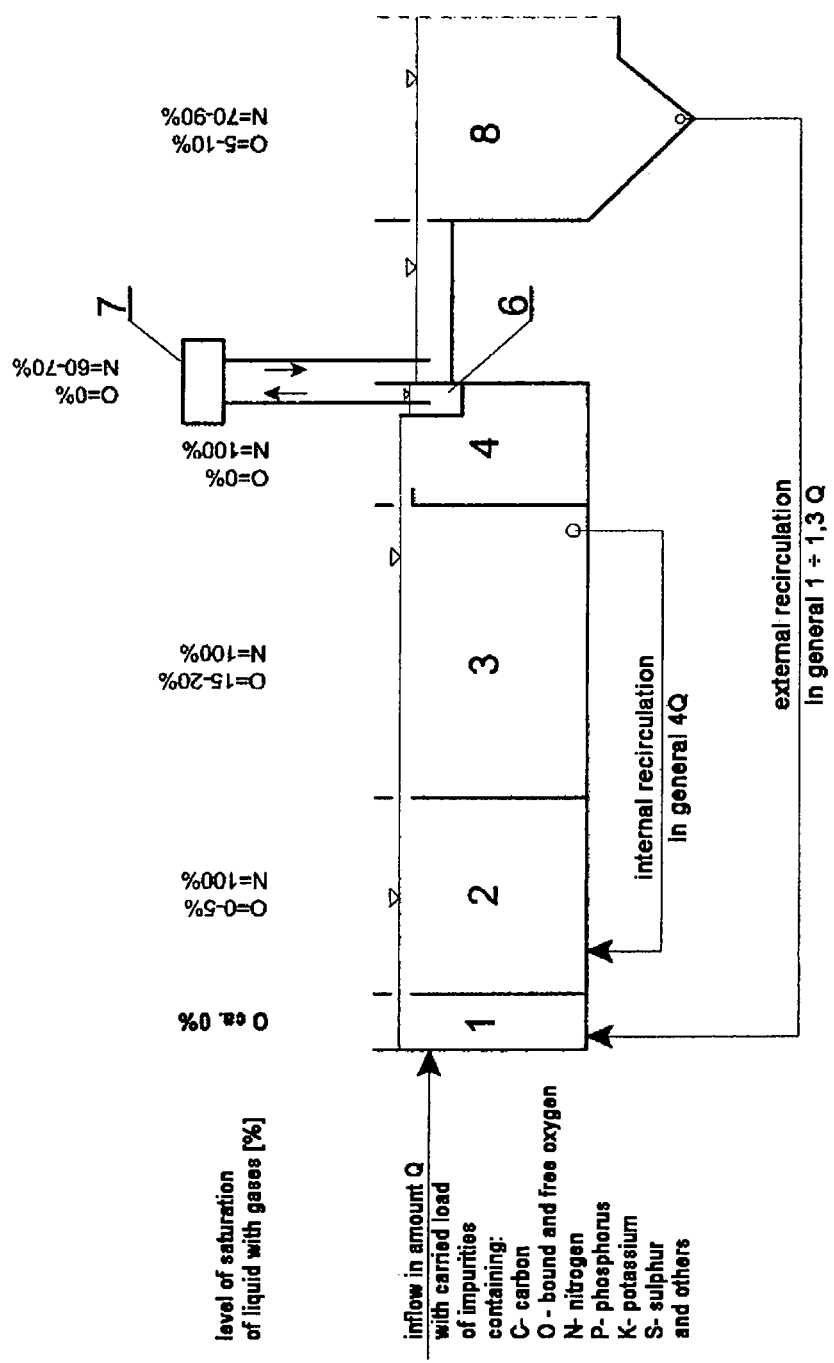
FIG. 2 shows a wastewater treatment plant, in a continuous flow system, with additional denitrification volume, in a schematic diagram.

A plant as shown in FIG. 2 was implemented where a flow of wastewater routed for treatment was assumed for the amount of Q=1000 m³/d, of a carbon impurities load BZT=300 kg/d and a nitrogen load of 75 kg/d, at a temperature t=22° C. For purposes hereof the word volume refers to an area where an activity occurs, and is used interchangeable with the word tank.

In the plant the process was implemented at a sludge concentration of 7.5 kg of dry mass in 1 m³ and under external recirculation equal to 100%, which is Q, and internal recirculation equal to 400%, which is 4 Q, of the wastewater inflow. The flow through dephosphatation volume is 2 Q and is routed to a denitrification volume 2, where taking into account the internal recirculation inflow would be $Q+Q_{rz}+4\ Q_{rw}$, i.e. 6 Q in total. This amount of flow is routed to a nitrification volume 3, where as a result of carrying out biochemical processes in active sludge oxidation occurs of various forms of nitrogen to the final nitrate form $NO_3^-$, according to the schematic reaction as provided below:

| | Nitrification | | | | |
|---|---|---|---|---|---|
| Step I | bacterial cells | + food (COHNS) + $O_2$ | enzymes → | new cells | + $CO_2$ + $H_2O$ + $NH_3$ |
| Step II | nitrification cells (organisms) | + $NH_3$ + $O_2$ | enzymes → (via $NO_2$) | $NO_3^-$ + $H_2O$ | new nitrification cells |

The nitrification volume is diluted with internal recirculation fed after denitrification process, and as a result the nitrates produced in the nitrification volume become diluted with the recirculation stream of a diminished amount of nitrates after denitrification process.

Outflow from the denitrification volume 3 is divided into two streams. One that comprises averaged amounts and constitutes a considerably larger part, is as an internal recirculate in an amount of 4 Q routed to the beginning of the process to the denitrification volume 2, where it is mixed with raw wastewater inflow rich in readily available carbon that reacts in biochemical processes with nitrates $NO_3^-$ with releasing nitrogen in a gaseous form and discharging into atmosphere according to the schematic denitrification reaction $2NO_3 \rightarrow process \rightarrow N_2 + 3O_2$.

On the other hand, nitrogen inflowing with raw wastewater has forms of various compounds and does not undergo transformation within the denitrification volume 2, is routed in the common flow to the nitrification volume where is oxidized to nitrogen in a form of nitrates $N-NO_3^-$ in the process with the use of readily available carbon carried in raw wastewater.

The other stream that comprises nitrogen in an averaging amount within the nitrification volume, i.e. in an amount as in the internal recirculation stream, constitutes the outflow.

In the biochemical process being carried out, within the denitrification 2 and nitrification 3 volumes, taking into account the internal recirculation, nitrogen was removed in an amount of 60 kg. As a result, at the outflow from the denitrification volume 3 there remains:

75 kg−60 kg=15 kg of nitrogen, which gives an averaged amount of nitrogen in 1 $m^3$ at outflow from the nitrification volume:

15 kg:1000 $m^3$=0.015 kg/$m^3$∼15 g/$m^3$, or at the outflow from the nitrification volume there is:

15 g/$m^3$ of nitrogen.

The other stream flowing from the same nitrification volume 3 in an amount of 2 Q, comprising after the nitrification process also nitrogen in an amount of 15 g N—$NO_3^-$, is routed to further flow to the additional denitrification volume 4, where life processes of highly active sludge occur under entirely oxygen-free conditions (no gaseous oxygen), since the included in the inflow oxygen dissolved in water, under conditions of high sludge concentration, becomes consumed at the inflow within 1-2 minutes, at very high sludge concentration applied conventionally in operation possible for sludge vacuum degassing technology, while intensively stirring of the contents thereof and under conditions of induced deficiency of readily available carbon, and thereby additional denitrification process is performed.

Within this volume, the active sludge with large oxygen resources at its disposal in a form of nitrates $NO_3^-$ to maintain life processes, is forced to consume residues of not readily available and then minimally available carbon.

As a result of biochemical processes of living sludge, carried out within this volume, a decrease in the nitrate content occurs to a level of 12 g/$m^3$ N—$NO_3^-$, with concurrent full consumption of the residues of averagely available carbon and with the use of minimally available carbon.

Thus within this volume reduction of nitrogen impurities occurs in an amount of:

15 g/$m^3$−12 g/$m^3$=3 g/$m^3$, which constitutes a reduction of:

(3:15)×100%=20% and removes from the entire process nitrogen in an amount of:

1000 $m^3$/d×0,003=3 kg.

Then the flow, in which all the time the biochemical transformation process is carried out with removal of nitrogen, is routed to the vacuum degassing volume 7, where an undersaturation is produced at a level of 30% of undersaturation to the secondary sedimentation tank 8, and where the denitrification process under oxygen-free conditions is continued in a layer of sedimentation and thickening of the sludge situated on the bottom of the sedimentation tank, with decomposition of nitrates $NO_3^-$ into oxygen used in a part of sludge life processes and with separation of nitrogen in a gas form which is immediately dissolved in the produced by vacuum degassing nitrogen-undersaturation of the aqueous solution, without full use of this undersaturation, (the volume of which as practice shows is difficult to obtain, and remains within the range of 25-40%), and its possibly high retaining capability determines better or worse sedimentation capability of sludge with elimination at a larger or smaller extent the phenomenon of swelling and floating of sludge in the sedimentation tank.

As a result of this further phase of the process which was run in the undersaturated aqueous volume of the secondary sedimentation tank 8, a further decrease in the nitrogen content occurs to a level of 10 g/$m^3$ N—$NO_3^-$.

Under the wastewater temperature t=22° C. solubility of gaseous nitrogen in water is 16 g/$m^3$. A saturation deficiency of 30% was produced.

Gaseous nitrogen undersaturation of the liquid would be:

16 g/$m^3$×0.30=4.8 g/$m^3$.

Nitrogen reaction within the volume of the secondary sedimentation tank 8 running under conditions of absence of readily available carbon, but in a relatively long dwelling time in the sedimentation tank was:

12 g/$m^3$−10 g/$m^3$=2 g/$m^3$, and this constitutes a reduction equal to:

(2:10)×100%≈20% relative to the inflow, and removes nitrogen from the entire purification process in an amount of:

1000 $m^3$/d×0.002=2 kg

Gaseous nitrogen-undersaturation of the liquid was filled in and amount of the nitrification-removed nitrogen and is:

4.8−2=2.8 kg/$m^3$, which ensures maintaining good sedimentation capability of the sludge.

Example 2

Figure 3:
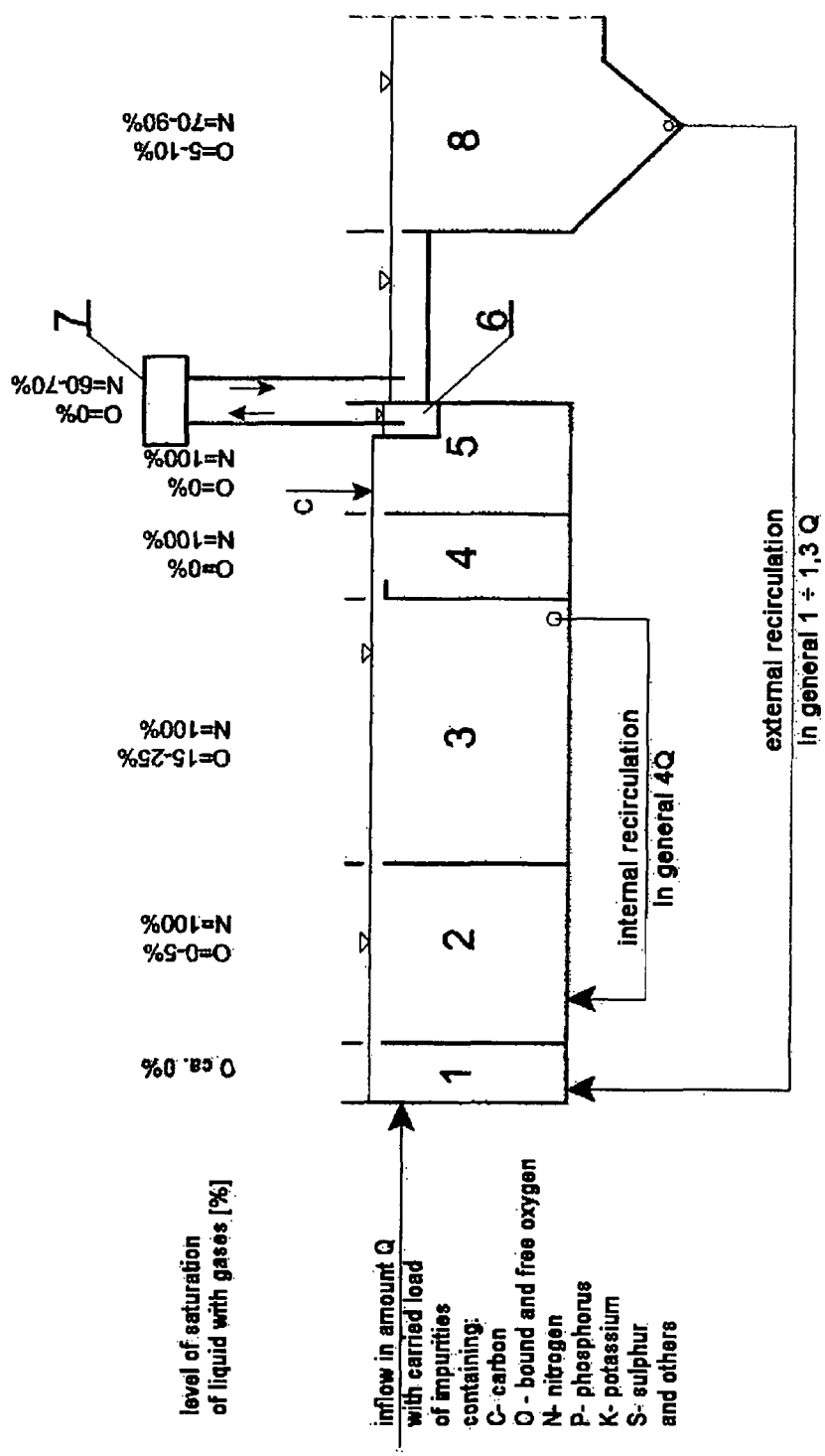
FIG. 3 shows a wastewater treatment plant, in a continuous flow system with additional denitrification volume and with deepened nitrate removal volume, in a schematic diagram.

A plant as illustrated in FIG. 3 was implemented where flow was in an amount of 10000 $m^3$/d, with a carbon impurities load BZT=3000 kg/d∼0.300 kg/$m^3$=300 g/$m^3$ and nitrogen load of 750 kg/d∼0.075 kg/$m^3$=75 g/$m^3$, at a wastewater temperature t=22° C. and with a raised requirement of nitrogen removal up to the value of 5 g/$m^3$ at the outflow and with a minimum consumption from an external carbon source.

In the plant a sludge concentration of 8.5 kg of dry mass in 1 $m^3$ was used, with external recirculation of 120% which is 1.2 Q and internal recirculation equal to 400% which is 4 Q.

The wastewater inflow was routed to the dephosphatation volume 1, where it is mixed with the stream of the external wastewater recirculation equal to 1.2 Q and flows through the dephosphatation volume in a stream of 2.2 Q, which is introduced into the denitrification volume 2, where it is mixed with the internal recirculation stream an flows through the dephopsphatation volume in a stream of 6.2 Q, which is routed to the nitrification volume 3.

In the nitrification of volume 3, there occurs nitrification process of the nitrogen carried by wastewater and present in various forms to nitrogen in a form of nitrates N—$NO_3^-$, according to the schematic reaction:

$$\text{nitrification cells (organisms)} + NH_3 + O_2 \xrightarrow[\text{(via } NO_2\text{)}]{\text{enzymes}} NO_3^- + H_2O \quad \text{new nitrification cells}$$

Within this volume also all forms of readily available carbon are consumed, both for the nitrification process and for removal of carbon impurities.

From the nitrification volume 3 obtained, nitrates flow in the internal recirculation stream and are routed to the denitrification volume 2, where in the presence of readily available carbon carried with raw wastewater, with a partial consumption thereof, reduction of nitrates is effected with release of nitrogen in its gaseous form to the atmosphere.

$$2NO_3 \rightarrow N_2 + 3O_2$$

As a result of these processes run within the volumes 2 and 3, with the use of internal recirculation, within the recirculation volume 3 averaged by denitrification, nitrogen/nitrate was reduced to a level of 10 $g/m^3$.

This constituted nitrogen reduction by a value of:

$$75 \text{ g/m}^3 - 10 \text{ g/m}^3 = 65 \text{ g/m}^3,$$

which means removal from the entire flow of nitrogen of:

$$1000 \text{ m}^3/\text{d} \times 0.065 = 650 \text{ kg/d}$$

The mixture 3 included in the nitrification volume, comprising 11 $g/m^3$ nitrogen/nitrate routed to the nitrification volume is divided into two streams. One of them constitutes denitrification recirculation, while the other one constitutes the outflow comprising 11 $g/m^3$ nitrogen/nitrates routed to the additional denitrification volume 4, where under conditions of intense stirring of the contents thereof present with a very high concentration of active sludge and with complete absence of gaseous oxygen, the additional denitrification process is carried out.

Within this volume, the active sludge for carrying out life processes has very large oxygen resources present in a form of nitrates, readily available for the sludge and for effecting its life processes it is forced to consume the only source of carbon in a minimally available and very minimally available form, so as to reduce nitrogen/nitrates to a gaseous form according to the reaction:

$$2NO_3 \rightarrow \text{process} \rightarrow N_2 + 3O_2.$$

In this denitrification process also a part of carbon is removed, said carbon being carried along with wastewater to escape to atmosphere in a form of carbon dioxide, according to the reaction:

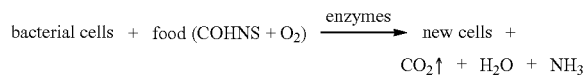

As a result of the denitrification process nitrogen/nitrates were reduced in the outflow to a level of 7.0 $g/m^3$.
Nitrogen reduction was thus:

$$10 \text{ g/m}^3 - 7 \text{ g/m}^3 = 3 \text{ g/m}^3,$$

which renders nitrogen reduction of a value:

$$(3:11) \times 100\% \approx 30\%$$

and reduction of the amount of load fed to the wastewater treatment plant:

$$10000 \times 0.003 = 30 \text{ kg/d of nitrogen}.$$

Then, the flow free from averagely available and hardy available carbon is routed to the deepened denitrification volume 5, where an external carbon source in a limited amount is added to ensure further, this time very intense, course of denitrification process with assumption of complete consumption of this carbon added in such amount so as the denitrification process run in further parts of the plant, which is within the vacuum degassing volume 6 and within the secondary sedimentation tank, and substantially within its undersaturated aqueous volume, does not fulfill completely the obtained gaseous nitrogen undersaturation of the liquid.

Within the deepened denitrification volume 5 nitrogen was reduced to a level of 4.5 $g/m^3$.
Nitrogen reduction within this volume was thus:

$$7 \text{ g/m}^3 - 4.5 \text{ g/m}^3 = 2.5 \text{ g/m}^3,$$

which provides nitrogen/nitrates reduction within this volume of:

$$(2.5:7) \times 100\% = 36\%$$

and load reduction of:

$$10000 \times 0.0025 = 25 \text{ kg/d}.$$

In such a demanding process, for such a high level of nitrogen removal, it is necessary to produce undersaturation at a higher level than in other processes. Saturation of water at a temperature of 22° C. is 16 $g/m^3$.

An undersaturation of 40% was produced, which means that undersaturation is:

$$16 \text{ g/m}^3 \times 0.4 = 6.4 \text{ g/m}^3.$$

From the vacuum degassing volume 7 purified wastewater is routed to the secondary sedimentation tank, where in the area of sedimentation and thickening of sludge deposited on the bottom, within the gaseous nitrogen unsaturated aqueous volume an intense denitrification process continues until the residues of the added carbon are consumed, and after depletion thereof the process runs much less intensively basing on the residues of the non-removed from the additional denitrification volume 4 minimally available carbon, carried along with wastewater, and with the use of internal carbon from cells of active sludge. Within this denitrification volume nitrogen/nitrates were reduced to a level of 3.0 $g/m^3$, and this renders a reduction of:

$$(1.5:4.5) \times 100\% = 33\%,$$

and a load amount reduction of:

$$10000 \text{ m}^3/\text{g} \times 0.0015 = 15 \text{ kg/d},$$

leaving a nitrogen content at the outflow of the wastewater treatment plant in the amount of:

nitrogen generally 3.0 $g/m^3$.

The deficiency in nitrogen saturation of water in the amount of 6.4 $g/m^3$ was fulfilled in the amount of 1-2 $g/m^3$ and remained at an undersaturation level of:

$$6.4 \text{ g/m}^3 - 3.0 \text{ g/m}^3 = 3.4 \text{ g/m}^3$$

This ensures a high sedimentation capability of sludge and a reserve for the account of penetration of a portion of the added external carbon due to flow irregularities and operational inaccuracies of the plant.

It should be noted that addition of an external source of readily available carbon in practice holds up the denitrification process based on the use of minimal available carbon carried and still remaining in wastewater after the additional denitrification process. The process for the use of this carbon carried along with wastewater, as well as optional consumption of the intracellular carbon of the active sludge is reassumed only after complete consumption of the readily available carbon added from an external source and passes to the gaseous nitrogen undersaturated aqueous volume of the secondary sedimentation tank where the residues of the external carbon and the residues of the carbon carried along with wastewater become depleted. All this occurs only and solely in a plant equipped for means for vacuum degassing.

It is also possible, with addition of lower amounts of external carbon, to terminate the process of using it in the deepened denitrification volume 5 and to initiate therein consumption of carbon carried still with wastewater and continue this process in the second sedimentation tank.

The course and intensity of these processes may be adjusted by means of the amount of dose of external carbon as desired, suitably to the inflow of impurities or temperature of wastewater, so as to transfer at a larger or smaller extent the consumption of residual carbon carried along with wastewater. It is also possible to resign from this process and to transfer the consumption of added external carbon residues to the secondary sedimentation tank volume without consumption of residues of carbon carried along with wastewater.

Example 3

Figure 4:
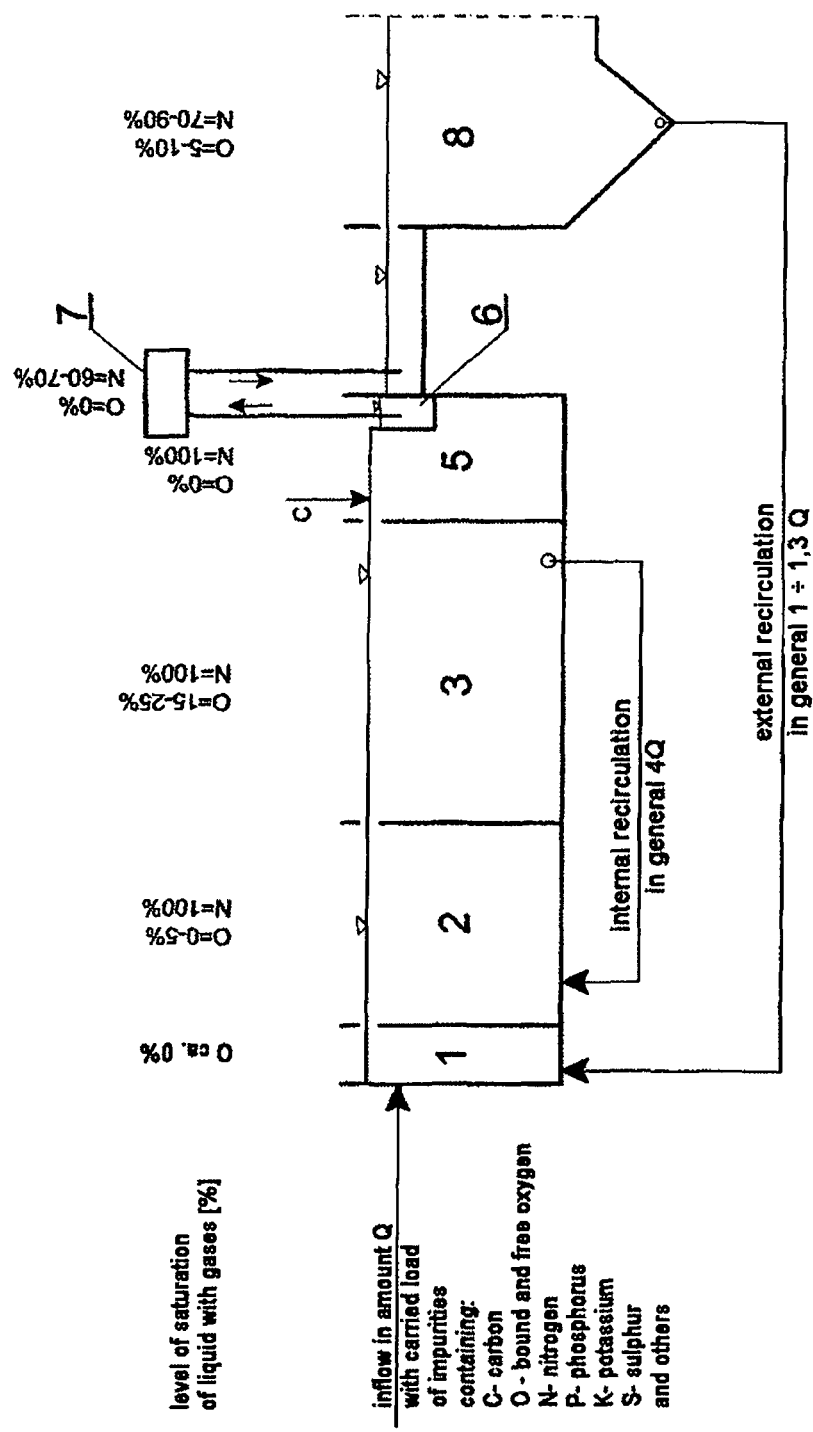
FIG. 4 shows a wastewater treatment plant, in a continuous flow system with deepened nitrate removal volume, in a schematic diagram.

A plant as shown in FIG. 4 was implemented, where the flow was 10000 m³/d, with a carbon impurities load BZT=3000 kg/d and nitrogen load 750 kg/d, at wastewater temperature t=22° C. and with a very demanding requirement of nitrogen removal up to a value of 3 g/m³ at the outflow and with minimum consumption from external carbon source.

In the plant, a sludge concentration in the amount of 8.5 kg of dry mass in 1 m³ was used, with external circulation of 120% which is 1.2 Q and internal recirculation equal to 400% which is 4 Q.

Wastewater inflow is routed to the dephosphatation volume 1, where it is mixed with the stream of external wastewater recirculation equal to 1.2 Q and flows through the dephosphatation in a stream of 2.2 Q, which is introduced into the denitrification volume 2, where it is mixed with the stream of internal recirculation and flow through this volume in a stream of 6.2 Q, which is routed to the nitrification volume 3.

Within the nitrification volume 3 the nitrification process occurs of the nitrogen carried along with wastewater, being present in various forms of nitrogen in nitrate form $N—NO_3^-$. Within this volume also consumption of all readily available carbon is effected.

From the nitrification volume 3 thus obtained nitrates flow in the internal recirculation stream and are routed to the denitrification volume 2, where at the presence of readily available carbon carried along with raw wastewater, with a partial consumption thereof, nitrates are reduced with releasing of nitrogen in gaseous form being discharged to the atmosphere.

$$2NO_3 \rightarrow N_2 + 3O_2.$$

As a result of the processes run within the volumes 2 and 3, with the use of internal circulation, nitrogen was reduced in an amount of 660 kg. As a result, at the outflow from the nitrification chamber there remains nitrogen:

750 kg–660 kg=90 kg, which corresponds to the amount of nitrogen:

90 kg:10000 m³=0.009 kg/m³ (9 g/m³).

These amounts of impurities are routed in the stream of further outflow to the deepened denitrification volume 5, in communication to a carbon source added externally in an amount to ensure nitrogen reduction within this volume by the amount of 4 g/m³, which provides a reduction of load in the treatment plant by further:

10000 m³/d×0.004 g/m³=40 kg/d, at a nitrogen reduction rate of:

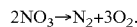(4 g/m³:9 g/m³)×100=44.4%.

Within the deepened denitrification volume 5, as a result of addition of an external carbon source, applied in a readily available form for the sludge, an impetuous denitrification process occurs with consumption of this carbon. Additionally, residues of averagely available and minimally available carbon, carried along with inflow to the volume 5 remain intact after this deepened denitrification process and enter the denitrification process after complete depletion of the external carbon fed to the purification process.

For a further outflow the amount of nitrogen in wastewater will amount to:

9 g/m³–4 g/m³=5 g/m³.

Outflow from the deepened denitrification volume 5 through the suction chamber 6 of the vacuum degassing tower 7 of the sludge is routed to the secondary sedimentation tank 8 where under the created conditions of nitrogen-undersaturation of water the denitrification process is carried out, without filling of the nitrogen-undersaturation of water, and this ensures that the nitrogen produced in the final denitrification process run within the secondary sedimentation tank 8 will be dissolved in the undersaturated liquid.

The addition of an external source of readily available carbon, in practice holds up the denitrification process based on consumption of residues of averagely available and minimally available carbon residues, carried along with and remaining in wastewater after the nitrification and denitrification processes, when taking into account the internal recirculation, performed within the volumes 2 and 3. The process for the use of this carbon carried along with the sludge, as well as optional consumption of the intracellular carbon of the active sludge is renewed only after complete consumption of readily available carbon, added from an external source, and is transferred to the gaseous nitrogen-undersaturated aqueous volume of the secondary sedimentation tank where external carbon residues and residues of carbon carried along with wastewater become depleted.

With the addition of lower amounts of external carbon, one may terminate the process of using it in the deepened denitrification volume 5 and to initiate therein consumption of carbon carried still with wastewater and continue this process in the second sedimentation tank.

The course and intensity of these processes may be adjusted by means of the amount of dose of external carbon as desired, suitably to the inflow of impurities or temperature of wastewater, so as to transfer at a larger or smaller extent consumption of residual carbon carried along with wastewater. It is also possible to resign from this process and to transfer consumption of added external carbon residues to the secondary sedimentation tank volume without the use of residues of carbon carried along with wastewater.

In the intense nitrogen removal process, it is necessary to produce a nitrogen undersaturation of the liquid at a level of about 40%, thus nitrogen undersaturation of water would be:

16 g/m³×0.40=6.4 g/m³.

Within the aqueous volume of the sedimentation tank, being gaseous nitrogen undersaturated, the final denitrification process is performed.

At the presence of residues of averagely available and minimally available carbon and with the use of forms of minimally available carbon, at a relatively long dwelling time within the water undersaturation within the secondary tank with the denitrification run in this manner, operationally considerably large reduction of nitrates was obtained, as results from availability of more readily available carbon sources, which were not removed within the volume operating basing on the added external carbon.

Further nitrogen reduction by an amount of 2.5 g/m³ was effected, and this finally provided a nitrogen reduction within the plant:

$$10000 \text{ m}^3/\text{d} \times 0.0025 = 25 \text{ kg/d},$$

with the outflow after purification at a level of $$5 \text{ g/m}^3 - 2.5 \text{ g/m}^3 = 2.5 \text{ g/m}^3 \text{ of nitrogen},$$

which corresponds to a nitrogen reduction rate of:

$$(2.5 \text{ g/m}^3 : 5 \text{ g/m}^3) \times 100 = 50\%.$$

The nitrogen deficiency in saturation of water, of 6.4 g/m³ was filled in the amount of 2 g/m³ and remained at an undersaturation level equal to:

$$6.4 \text{ g/m}^3 - 2.5 \text{ g/m}^3 = 3.9 \text{ g/m}^3.$$

This provides a high sedimentation capability of the sludge and ensures a reserve for penetration of temporary portions of the added external carbon due to flow irregularities and operational inaccuracies of the plant.

It is obvious that by means of increase in nitrogen reduction in the main process within the volumes 2 and 3 it is possible to diminish the external carbon dose. This may be achieved when deciding on the capacities of the volumes 2 and 3 and/or additionally by increasing the sludge concentration in the process.

With an external carbon source, it is possible to use wastewater inflow stream, which is routed with omission of the volumes 2 and 3 into the volume 5 or 4. This would be, an operation that would not result in nitrogen removal, and in particular its deep removal, since nitrogen included in the wastewater stream is not able to be removed in the course of nitrification and denitrification, and in its original form without removal is routed to the outflow.

Of course these methods are exemplary and alterations thereto are possible by those having skill in the relevant technology.

Thus the example embodiments and arrangements achieve improved capabilities, eliminate difficulties encountered in the use of prior methods and systems, and attain the desirable results described herein.

In the foregoing description, certain terms have been used for brevity, clarity and understanding. However, no unnecessary limitations are to be implied therefrom because such terms are used for descriptive purposes and are intended to be broadly construed.

Moreover the descriptions and illustrations herein are by way of examples and the inventive scope is not limited to the features shown and described.

Further, it should be understood that features and/or relationships associated with one embodiment can be combined with features and/or relationships from other embodiments. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are utilized and carried out, and the advantages and useful results attained, the new and useful arrangements, combinations, methodologies, structures, devices, elements, combinations, operations, processes and relationships are set forth in the appended claims.

I claim:

1. A method for wastewater treatment, in a continuous flow system, and capable of providing high level reduction of biogenic nitrate compounds, comprising:
   subjecting wastewater to consecutive steps to remove various forms of impurities included therein, including:
   a) passing incoming wastewater and active sludge into a first tank,
   b) carrying out dephosphatation of the material received in (a) in the first tank,
   c) passing the dephosphated material of (b) to a second tank,
   d) carrying out denitrification of the material passed in (c) in the second tank,
   e) passing the denitrified material of (d) to a third tank,
   f) carrying out nitrification of the material passed in (e) in the third tank,
   g) returning most of the nitrified material of (f) to the second tank,
   h) passing the remainder of the nitrified material of (f) not passed to the second tank in (g), to the a fourth tank,
   i) carrying out additional denitrification in the fourth tank of the material of (h) wherein readily available carbon and minimally available carbon in the wastewater is consumed,
   j) vacuum degassing the denitrified material of (i) in a vacuum degassing tower to provide an outflow of purified wastewater with nitrogen undersaturation and active sludge sediment,
   k) passing the outflow of (j) to a sedimentation tank wherein the outflow is maintained in the sedimentation tank in a nitrogen undersaturated aqueous zone and sludge sedimentation occurs,
   l) introducing at least a portion of the active sludge sediment of (k) into incoming wastewater prior to (b).

2. The method of claim 1,
   wherein in at least one of (i) and (k) at least some intercellular carbon of active sludge is consumed.

3. The method of claim 1, further comprising,
   prior to completion of (i) adding carbon from an external source of readily available carbon to the material passed from the fourth tank in (h).

4. The method of claim 3, wherein in (i) additional denitrification is carried out by the active sludge consuming the additional carbon added in from the external source.

5. A method for wastewater treatment, in a continuous flow system, and capable of providing high level reduction of biogenic nitrate compounds, comprising:
   subjecting wastewater to consecutive steps to remove various forms of impurities included therein, including:
   a) passing incoming wastewater and active sludge into a first tank,
   b) carrying out dephosphatation of the material received in (a) in the first tank,
   c) passing the dephosphated material of (b) to a second tank,
   d) carrying out denitrification of the material received in (c) in the second tank,
   e) passing the denitrified material of (d) to a third tank,
   f) carrying out the nitrification of the material received in (e) in the third tank,
   g) returning a majority of the nitrified material of (f) to the second tank,
   h) passing the remainder of the nitrified material of (f) not passed to the second tank in (g), to a fourth tank,
   i) adding readily available carbon to the nitrified material passed to the fourth tank in (h), j) carrying out additional denitrification in the fourth tank of the material of (h) with the readily available carbon added in (i) therein, wherein readily available carbon and minimally available carbon in the wastewater is consumed by active sludge, k) vacuum degassing the denitrified material of (j) to provide an outflow of purified nitrogen undersaturated wastewater and active sludge sediment, l) passing the purified wastewater and active sludge sediment material of (k) into a sedimentation tank, wherein the sedimentation tank includes an aqueous gaseous nitrogen under saturated zone, wherein in the sedimentation tank further denitrification occurs as the active sludge consumes residues of averagely available and minimally available carbon, including intercellular carbon in the active sludge.

6. A plant for wastewater treatment, in a continuous flow system, and capable of providing high level reduction of biogenic nitrate compounds, comprising:

a first tank configured to hold incoming wastewater and active sludge, wherein dephosphatation occurs in the first tank, a second tank, wherein the second tank is operatively fluid connected to the first tank, wherein dephosphated material from the first tank is received in the second tank, and wherein the second tank is configured to have the denitrification occur in the second tank, a third tank wherein the third tank is operatively fluid connected to the second tank, wherein the denitrified material from the second tank is received in the third tank, wherein the third tank is configured to have nitrification occur in the third tank, a recirculation line, wherein the recirculation line is operatively fluid connected to the third tank and the second tank, and wherein the recirculation line is operative to cause a portion of the nitrified material from the third tank to be delivered to the second tank, a vacuum degassing tower, wherein the degassing tower is operatively fluid connected to the third tank, wherein the degassing tower is operative to receive nitrified material from the third tank other than the portion delivered to the second tank, and wherein the degassing tower is operative to provide purified wastewater and active sludge sediment, a secondary sedimentation tank, wherein the secondary sedimentation tank is operatively fluid connected to the vacuum degassing tower wherein the secondary sedimentation tank is operative to receive the purified wastewater and active sludge sediment from the degassing tower, a further recirculation line, wherein the further recirculation line is operatively fluid connected to the secondary sedimentation tank and the first tank, wherein the further recirculation line is operative to cause active sludge sediment from the secondary sedimentation tank to enter the first tank, at least one fourth tank, wherein the at least one fourth tank is fluidly downstream of the third tank and fluidly upstream from the degassing tower, wherein the at least one fourth tank is configured to have additional denitrification occur therein.

7. The plant according to claim 6 further comprising:

a feeder, wherein the feeder is operative to feed carbon containing material into at least one fourth tank.

8. A method for wastewater treatment, in a continuous flow system, and capable of providing high level reduction of biogenic nitrate compounds, comprising:

subjecting wastewater to consecutive steps to remove various forms of impurities included therein, including:

a) passing incoming wastewater and active sludge into a first tank, b) carrying out dephosphatation of the material passed in (a) in the first tank, c) passing the dephosphated material of (b) to a second tank, d) carrying out denitrification of the material passed in (c) in the second tank, e) passing the denitrified material of (d) to a third tank, f) carrying out nitrification of the material passed in (e) in the third tank, g) returning most of the nitrified material of (f) to the second tank, h) passing the remainder of the nitrified material of (f) not passed to the second tank in (g), to a fourth tank, i) adding readily available carbon from an external source to the material passed to the fourth tank in (h), j) carrying out additional denitrification in the fourth tank of the material of (i), wherein carbon in the wastewater is consumed, k) vacuum degassing the denitrified material of (j) in a vacuum degassing tower to provide an outflow of purified nitrogen undersaturated wastewater and active sludge sediment, l) passing the outflow of (k) to a gaseous nitrogen undersaturated aqueous zone of a sedimentation tank, wherein in the sedimentation tank further carbon in the wastewater is consumed by the active sludge, further denitrification occurs, and sludge sedimentation occurs, m) introducing at least a portion of the active sludge sediment of (l) into the incoming wastewater prior to (b).

* * * * *